(12) United States Patent
Mudd et al.

(10) Patent No.: US 6,971,803 B2
(45) Date of Patent: Dec. 6, 2005

(54) MULTI-FIBER FERRULE WITH AN ALIGNMENT PORTION

(75) Inventors: Ronald L. Mudd, Grapevine, TX (US); David L. Dean, Jr., Hickory, NC (US); Alan J. Malanowski, Newton, NC (US); Joseph T. Cody, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/799,499

(22) Filed: Mar. 12, 2004

(65) Prior Publication Data

US 2005/0201691 A1    Sep. 15, 2005

(51) Int. Cl.[7] ................................................ G02B 6/38
(52) U.S. Cl. ............................ 385/71; 385/72; 385/78
(58) Field of Search .............................. 385/71, 72, 78, 385/53, 83, 84

(56) References Cited

U.S. PATENT DOCUMENTS

| | | | |
|---|---|---|---|
| 4,668,045 A | 5/1987 | Melman et al. | 350/96.2 |
| 5,909,530 A | 6/1999 | Ohkubo et al. | 385/147 |
| 6,062,740 A | 5/2000 | Ohtsuka et al. | 385/81 |
| 6,072,932 A | 6/2000 | Bennett et al. | 385/139 |
| 6,305,850 B1 | 10/2001 | Luther et al. | 385/78 |
| 6,350,062 B2 * | 2/2002 | Knecht et al. | 385/84 |
| 6,379,054 B2 | 4/2002 | Throckmorton et al. | 385/66 |
| 6,499,887 B2 | 12/2002 | Dean, Jr. et al. | 385/78 |
| 6,536,956 B2 | 3/2003 | Luther et al. | 385/86 |
| 6,585,421 B1 * | 7/2003 | Barnes et al. | 385/53 |
| 6,601,996 B1 * | 8/2003 | Rosson et al. | 385/78 |
| 6,688,782 B1 * | 2/2004 | Dean, Jr. et al. | 385/78 |
| 6,764,223 B2 * | 7/2004 | Rosson et al. | 385/78 |
| 6,874,946 B2 * | 4/2005 | Cull | 385/71 |

* cited by examiner

*Primary Examiner*—Chandrika Prasad
(74) *Attorney, Agent, or Firm*—Christopher C. Dreman; Thomas M. Fisher (57) ABSTRACT

A multi-fiber ferrule is configured to accept coated optical fibers and an optical fiber ribbon. The multi-fiber ferrule includes an optical fiber receiving portion, a lead-in portion, and an alignment portion. The alignment portion includes a buffered fiber alignment portion to orient and separate buffered optical fibers. The alignment portion may also include a ribbon alignment portion to orient and align the optical fibers of an optical fiber ribbon. As a result, the stripped optical fibers of both the coated optical fibers and the optical fiber ribbon are guided and aligned with the optical fiber bores provided in the optical fiber receiving portion of the multi-fiber ferrule.

20 Claims, 6 Drawing Sheets

MULTI-FIBER FERRULE WITH AN ALIGNMENT PORTION

FIELD OF THE INVENTION

The present invention relates to a multi-fiber ferrule for coated optical fibers, and more particularly, to a multi-fiber ferrule that allows optical fibers from a fiber optic ribbon or buffered optical fibers to be easily inserted into and secured in the ferrule.

BACKGROUND OF THE INVENTION

There are a number of prior art multi-fiber ferrules, however, none of these multi-fiber ferrules will easily accommodate optical fibers from both a fiber optic ribbon and buffered fibers. Typically, the multi-fiber ferrules have a configuration that allows for easy insertion of the fibers in the form of optical ribbons. However, the optical fibers that are buffered must be twisted and turned to be inserted into the ferrule. The twisting and turning of the buffered optical fibers can cause the optical fibers to be misaligned and can prevent the optical fibers from being properly secured with epoxy in the ferrule.

Accordingly, the present invention is directed to a multi-fiber ferrule that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a multi-fiber ferrule having a front face and an opposed rear face and defining a longitudinal axis in a lengthwise direction, the multi-fiber ferrule includes an optical fiber receiving portion adjacent the front face for receiving an end portion of at least one optical fiber, said optical fiber receiving portion comprising a plurality of optical fiber bores extending parallel to the longitudinal axis, a lead-in portion adjacent the rear face for receiving and guiding the at least one optical fiber into the multi-fiber ferrule, and an alignment portion between the optical fiber receiving portion and the lead-in portion for receiving the at least one optical fiber and aligning the end portion of the at least one optical fiber with a respective one of the plurality of optical fiber bores.

In yet another aspect, the invention is directed to a multi-fiber ferrule body that includes a front face, an opposed rear face, an optical fiber receiving portion extending for a least a portion of a distance between the front and rear faces, the optical fiber receiving portion being adjacent the front face of the multi-fiber ferrule body to receive an end of at least one optical fiber and comprising a plurality of optical fiber bores extending from the front face toward the rear face, an alignment portion disposed between the optical fiber receiving portion and the rear face for receiving the at least one optical fiber and aligning the end portion of the at least one optical fiber with a respective one of the plurality of optical fiber bores, wherein the at least one optical fiber being chosen from the group consisting of a buffered optical fiber and an optical fiber ribbon.

In another aspect, the present invention is directed to a multi-fiber ferrule having a front face and an opposed rear face and defining a longitudinal axis in a lengthwise direction, the multi-fiber ferrule includes an optical fiber receiving portion adjacent the front face for receiving an end portion of at least one optical fiber, said optical fiber receiving portion comprising a plurality of optical fiber bores extending parallel to the longitudinal axis, a lead-in portion adjacent the rear face for receiving and guiding the at least one optical fiber into the multi-fiber ferrule, and an alignment portion between the optical fiber receiving portion and the lead-in portion for receiving the at least one optical fiber and aligning the end portion of the at least one optical fiber with a respective one of the plurality of optical fiber bores, the alignment portion defining at least a portion having a generally oval cross section and comprising at least one separating rib for separating a plurality of optical fibers.

It is to be understood that the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

FIGS. 1–7 illustrate a multi-fiber ferrule 10 according to one embodiment of the present invention. The multi-fiber ferrule 10 is preferably a window-less type ferrule that has a front face 12 and a rear face 14. However, the ferrule 10 may also have a window if so desired. As explained in more detail below, the configuration of the multi-fiber ferrule 10 obviates the specific advantages of a window. The multi-fiber ferrule 10 may also have a shoulder 16 to engage a fiber optic plug housing 18 (see FIGS. 8 & 9). Additionally, as is known in the art, the multi-fiber ferrule 10 shown and described herein has two fiber optic guide pin bores 20, 22 to assist in aligning the multi-fiber ferrule 10 with another ferrule in a mated pair.

Figure 1:
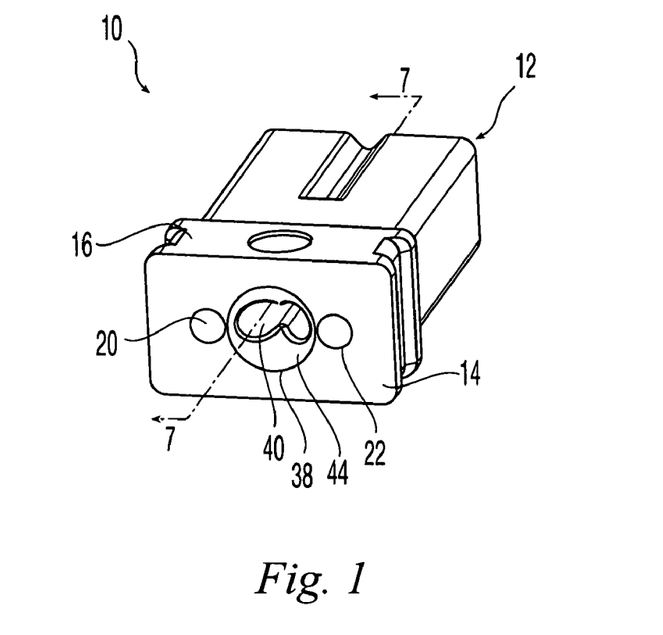
FIG. 1 is a rear isometric view of a multi-fiber ferrule according to one embodiment of the present invention.
Figure 2:
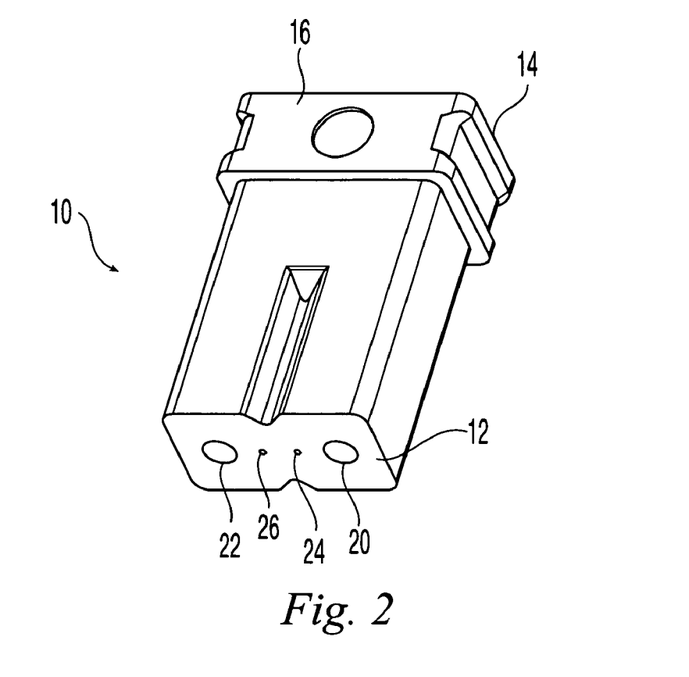
FIG. 2 is a front isometric view of the multi-fiber ferrule of FIG. 1.
Figure 3:
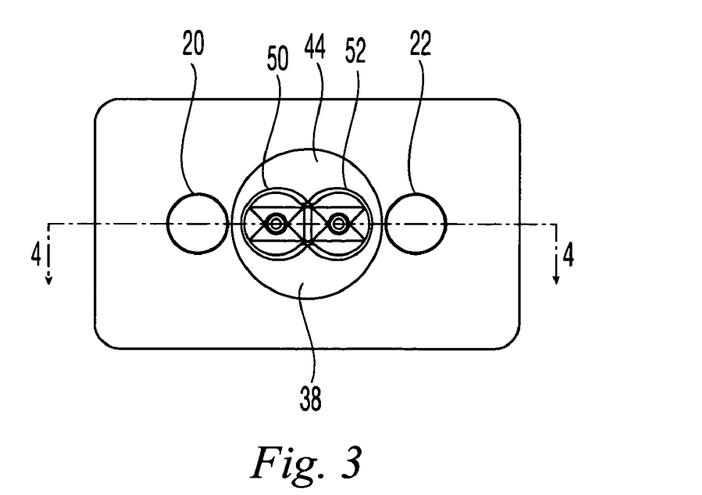
FIG. 3 is a rear view of the multi-fiber ferrule of FIG. 1.
Figure 4:
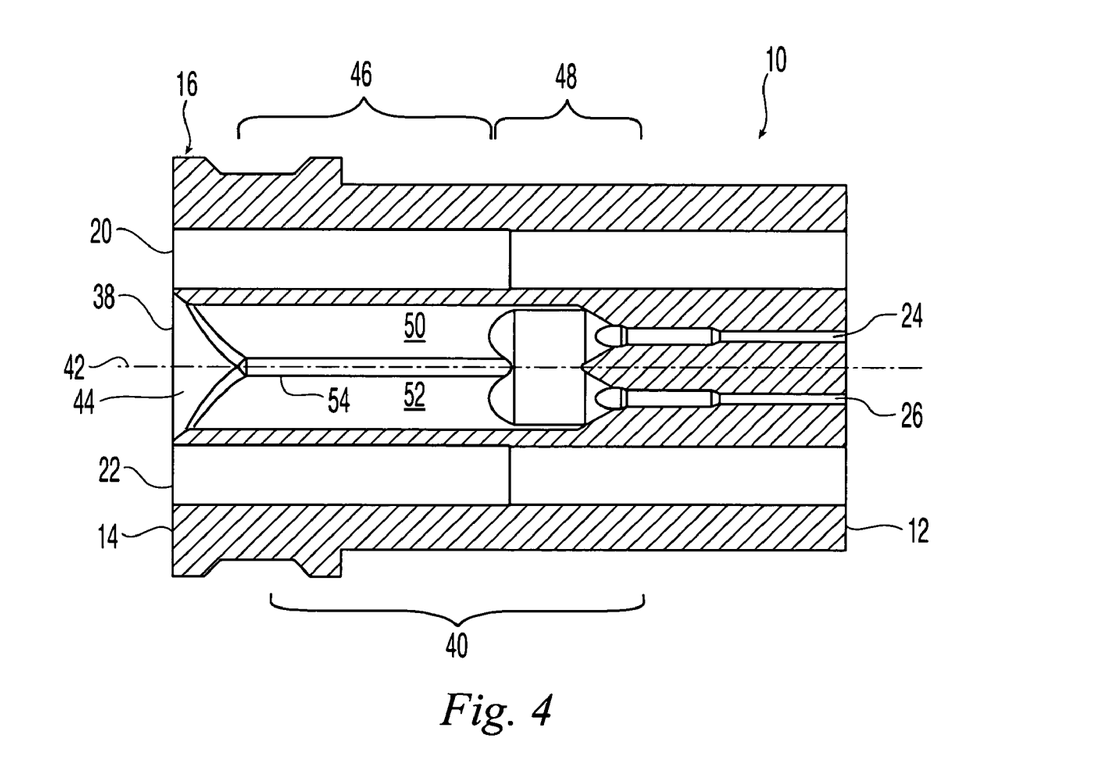
FIG. 4 is a cross section view of the multi-fiber ferrule in FIG. 3 taken along the line 4—4.
Figure 5:
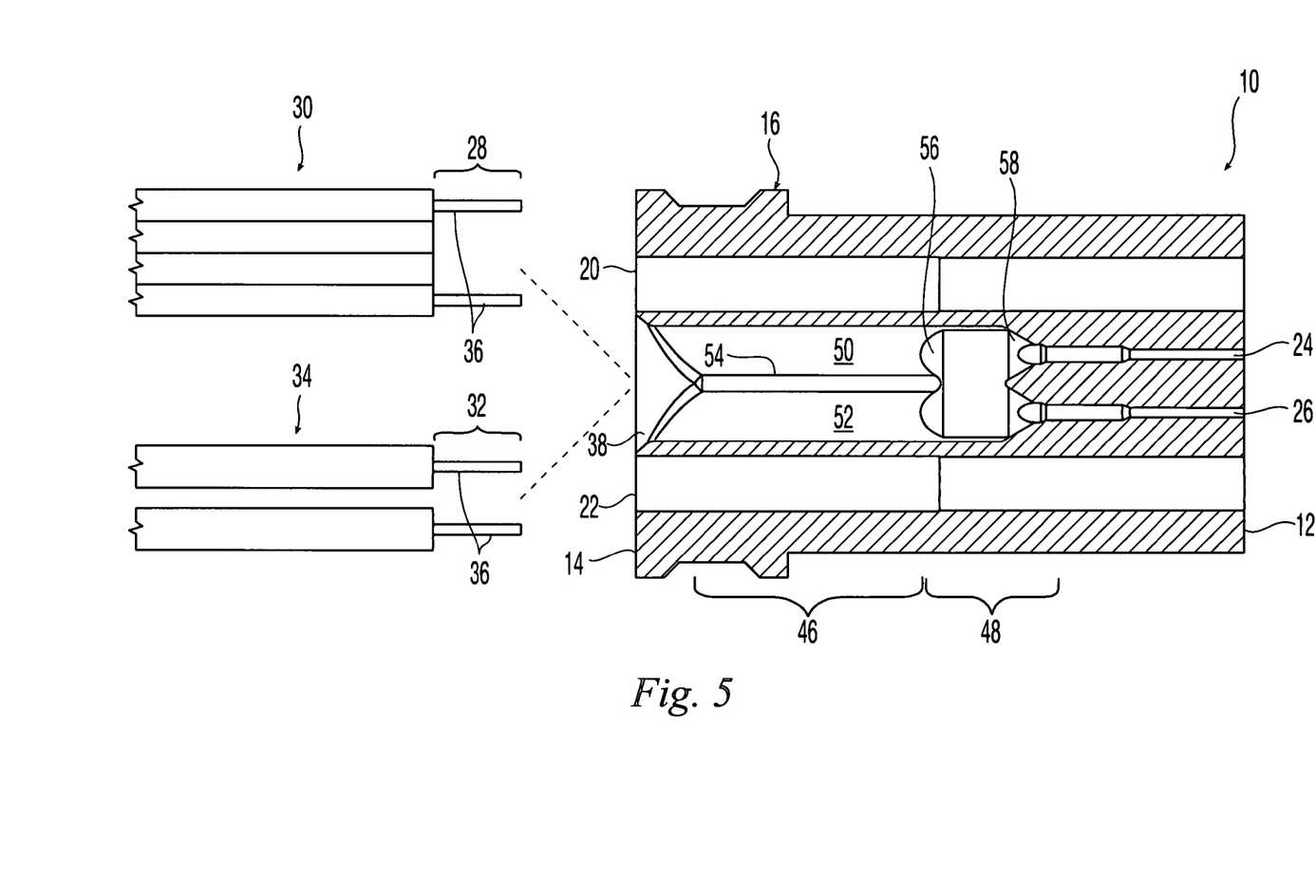
FIG. 5 is a cross section view of the multi-fiber ferrule in FIG. 4, with optical fibers positioned to be inserted.

Preferably, the multi-fiber ferrule 10 has an optical fiber receiving portion 23 (FIG. 7) that includes two optical fiber bores 24, 26 to receive an end portion 28, 32 of an optical fiber 30, 34 (FIGS. 4 and 5). The optical fiber bores 24, 26 are adjacent to and extend through the front face 12 of the multi-fiber ferrule 10. The end portion 28, 32 of the optical fiber 30, 34 is preferably stripped of any matrix material, buffer material or coating prior to be inserted into the multi-fiber ferrule 10. As illustrated in FIG. 5, the optical fiber 30, 34 may be either an optical fiber ribbon 30 or a dual, buffered optical fiber cable 34 (for example, Mini-zip™ fiber optic cable available from Corning Cable Systems in Hickory, N.C.). As shown in FIG. 5, the center two optical fibers of the optical fiber ribbon 30 may either be severed or may be made with dummy fibers. Each of the buffered optical fibers in optical fiber cable 34 are typically 650 microns in diameter, but any size buffered optical fiber could be used. The end portions 28, 32 are striped of any matrix material, buffer material or coating so that the stripped optical fibers 36 are approximately 125 microns in diameter. The length of the stripped optical fibers 36 depends on the type of optical fiber, the dimensions of the multi-fiber ferrule 10, and the post-insertion processing techniques.

In order to be inserted into and through the optical fiber bores 24, 26, the optical fibers 30, 34 are inserted into a tapered lead-in portion 38 adjacent the rear face 14 of the multi-fiber ferrule 10. The lead-in portion 38 assists in guiding the optical fibers 30, 34 into the alignment portion 40 of the multi-fiber ferrule 10. The lead-in portion 38 expands radially outward from a longitudinal axis 42 through the multi-fiber ferrule 10 in a direction from the alignment portion 40 to the rear face 14. Thus, the shape of the lead-in portion 38 assists by guiding the optical fibers into the multi-fiber ferrule 10, and more particularly, the alignment portion 40. The lead-in portion 38 may expand in a linear fashion, providing for a straight wall 44 or it may also expand in a non-linear fashion causing the wall 44 to be curved.

Figure 10:
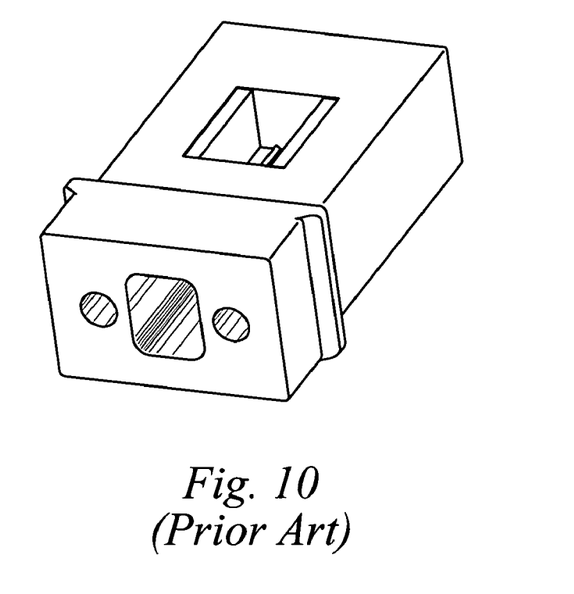
FIG. 10 is a rear view of a prior art ferrule.

The alignment portion 40 of multi-fiber ferrule 10 preferably includes two portions—a buffered fiber alignment portion 46 and a ribbon alignment portion 48. As best viewed in FIGS. 1, 3, and 4, the buffered alignment portion 46 is adjacent the lead-in portion 38 and generally has an oval cross section. In one embodiment, the buffered alignment portion 46 has two generally circular portions 50, 52 that have a rib 54 therebetween to further distinguish the generally circular portions 50, 52. The buffered alignment portion 46 may also be two overlapping truncated circular portions. The rib 54 need not be present, but assists in separating and aligning the buffered optical fibers 34 in the multi-fiber ferrule 10, and more particularly, aligning them parallel to the longitudinal axis 42. As the buffered optical fibers 34 are inserted into the multi-fiber ferrule 10, the lead-in portion 38 guides them into the buffered alignment portion 46, where the two generally circular (in cross section) portions 50, 52 and rib 54 separate and orient the buffered optical fibers 34 and the stripped optical fibers 36 with respective ones of the optical fiber bores 22, 24. The rib 54 assists in preventing the buffered optical fibers 34 from twisting and crossing over one another, as can occur in the prior art ferrules. As seen in FIG. 10, the opening in the back of the prior art ferrule is rectangular and does not provide any guidance or alignment to a buffered optical fiber. The rib 54 could be omitted entirely, made smaller, or even larger, provided there is sufficient space to allow the buffered optical fibers 34 to pass through the generally circular portions 50, 52. Furthermore, the rib 54 may have any convenient shape ad may be molded into the multi-fiber ferrule 10, machined into the multi-fiber ferrule 10, or formed in any suitable manner.

While the portions 50, 52, are illustrated to be generally circular, they could of any configuration that would assist in orienting the optical fibers 30, 34, including, for example, oval, hexagonal, etc. The buffered optical fibers 34 are then inserted until the buffer portion of the buffered optical fibers 34 makes contact with a shoulder 56. See FIG. 7. As noted above, the alignment portion 40 in the preferred embodiment is sized for a 650 micron buffered optical fiber. However, the buffered alignment portion 46 could be sized for any size buffered optical fibers, or even for any number of optical fibers.

Figure 6:
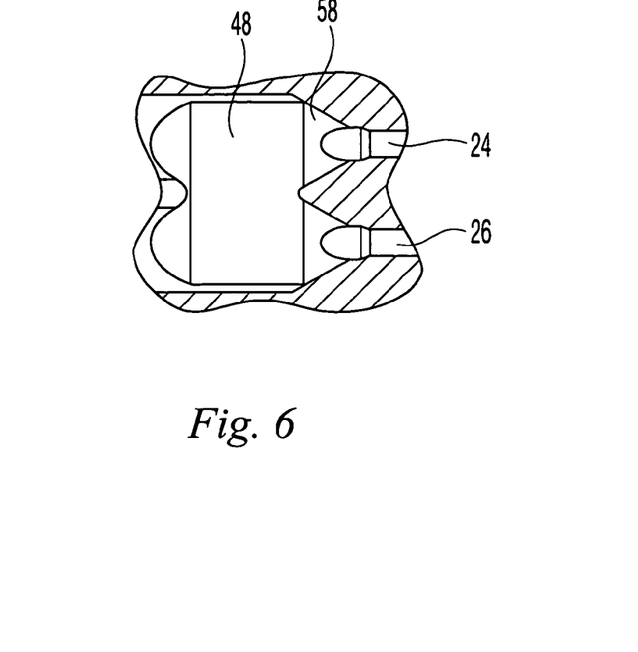
FIG. 6 is a partial cross sectional view of a portion of the optical fiber receiving portion and the alignment portion of the multi-fiber ferrule of FIG. 1.
Figure 7:
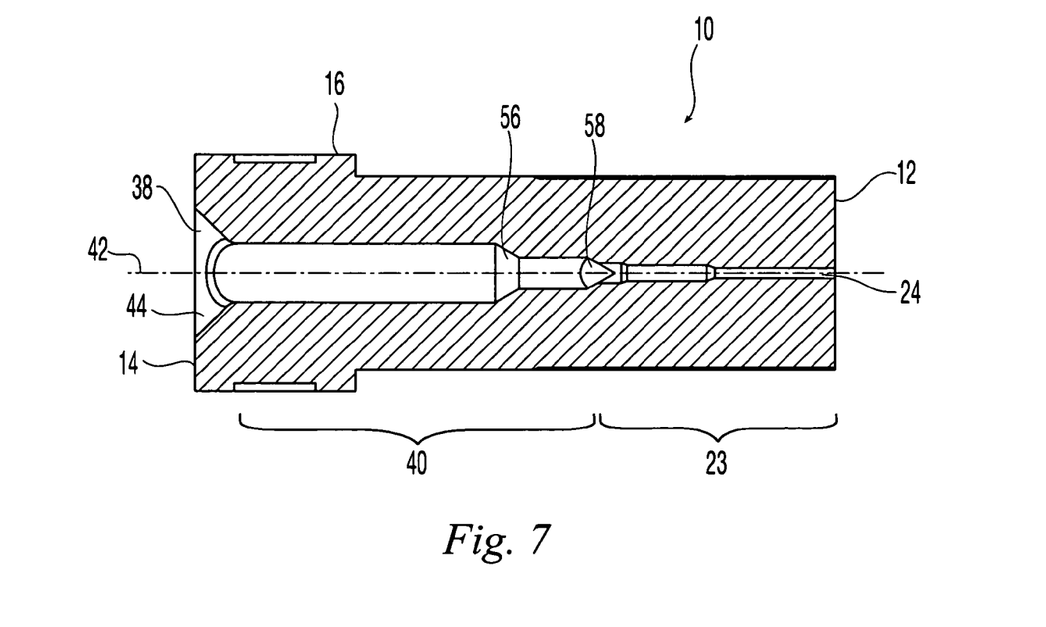
FIG. 7 is a cross section view of the multi-fiber ferrule in FIG. 1 taken along the line 7—7.
Figures 8, 9:
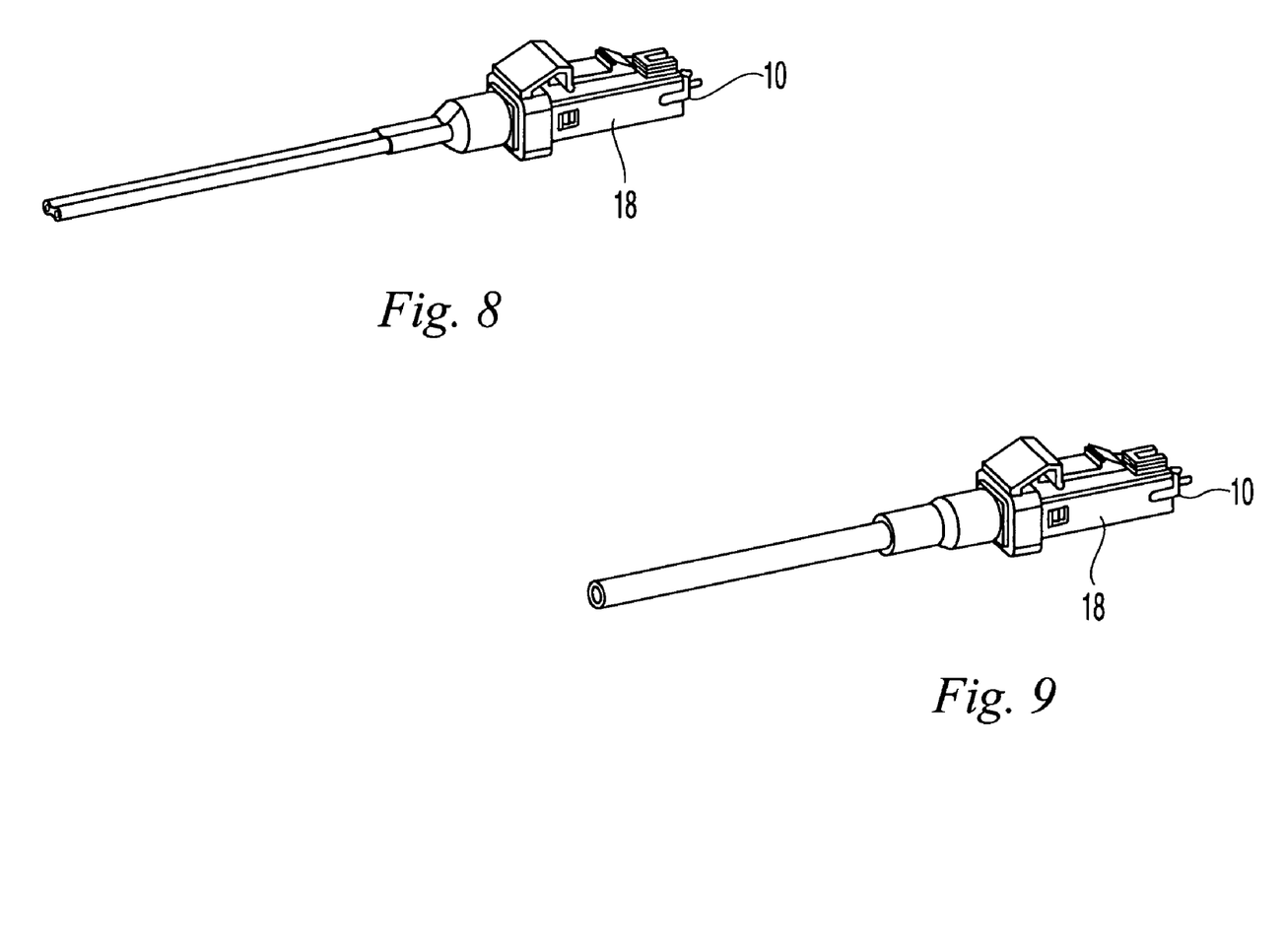
FIG. 8 is an isometric view of a fiber optic connecter with the multi-fiber ferrule of FIG. 1 shown with two buffered optical fibers.
FIG. 9 isometric view of a fiber optic connecter with the multi-fiber ferrule of FIG. 1 shown with an optical fiber ribbon.

The alignment portion 40 of multi-fiber ferrule 10 also includes a ribbon alignment portion 48. The ribbon alignment portion 48 is adjacent the buffered alignment portion 46 and also adjacent the optical fiber bores 24, 26. The ribbon alignment portion 48 is generally rectangular in cross section as best seen in FIGS. 5–7 and assists in orienting the optical fibers, which are illustrated in FIG. 5 to be an optical fiber ribbon 30. The ribbon alignment portion 48 could also have other shapes in cross section, including for example, oval, rectangular with rounded corners, etc., as long as the ribbon alignment portion 48 assists in orienting the optical fibers for insertion into the optical fiber bores 24, 26. As with the buffered optical fibers 34, the optical fiber ribbon 30 is guided into the alignment portion 40 by the lead-in portion 38. The optical fiber ribbon 30 passes through the buffered alignment portion 46, and may be oriented in a horizontal direction by the rib 54, if present. As the optical fiber ribbon 30 approaches the shoulder 56, the optical fibers 36 of the optical fiber ribbon 30 are funneled into and aligned by the ribbon alignment portion 48 to enter the optical fiber bores 24, 26. As can be seen in FIGS. 4, 6, and 7, there may also be a lead-portion 58 at the entrance to the optical fiber bores 24, 26 to further assist in aligning the optical fibers 36 with optical fiber bores 24, 26. Thus, the multi-fiber ferrule 10 aligns both buffered fibers as well as optical fiber ribbons. Connectorized buffered fibers and an optical ribbon that use the multi-fiber ferrule 10 are illustrated in FIGS. 9 and 10.

Figure 11:
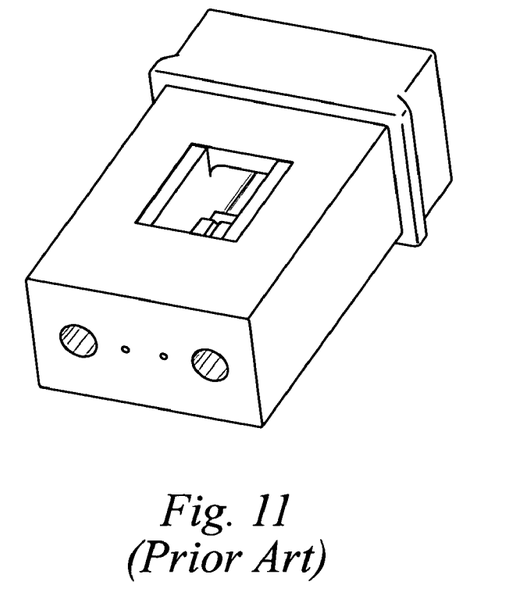
FIG. 11 is a front isometric view of the ferrule of FIG. 10.

The multi-fiber ferrule 10 of the present invention is a windowless ferrule. The window in the prior art ferrules in FIGS. 10 and 11, is used to permit pre-assembly of the ferrule, to assist in aligning the fibers in the optical fiber bores and to inject the epoxy into the ferrule to hold the optical fibers in the ferrule. However, the presence of the window and using it as an injection point of epoxy for the ferrule tends to be rather messy. The epoxy can easily flow out of the window during injection, handling of the ferrule prior to curing, and even during curing. The multi-fiber ferrule 10 of the present invention does not need to have a window for aligning the optical fibers or to inject the epoxy. The alignment portion 40 provides a sufficient guide for the optical fibers as discussed above. Thus, with the multi-fiber ferrule 10 of the present invention, the epoxy can be injected into the ferrule before the optical fibers are inserted into the ferrule. When the epoxy is injected into a prior art windowless ferrule, the optical fibers typically are not centered in the ferrule. In fact, the optical fibers tend to be pushed to one side, preventing the epoxy from adequately securing the optical fibers in the ferrule. However, that problem does not exist with the present invention as the alignment portion 40 appropriately centers and maintains the optical fibers in the ferrule, thereby allowing the epoxy to completely surround the optical fibers and provide a good bond.

It will be apparent to those skilled in the art that various modifications and variations can be made in the multi-fiber ferrule of the present invention without departing from the spirit or scope of the invention. Thus, it is intended that the present invention cover the modifications and variations of this invention provided they come within the scope of the appended claims and their equivalents.

That which is claimed is:

1. A multi-fiber ferrule having a front face and an opposed rear face and defining a longitudinal axis in a lengthwise direction, the multi-fiber ferrule comprising:
   an optical fiber receiving portion adjacent the front face for receiving an end portion of at least one optical fiber, said optical fiber receiving portion comprising a plurality of optical fiber bores extending parallel to the longitudinal axis;
   a lead-in portion adjacent the rear face for receiving and guiding the at least one optical fiber into the multi-fiber ferrule; and
   an alignment portion between the optical fiber receiving portion and the lead-in portion for receiving the at least one optical fiber and aligning the end portion of the at least one optical fiber with a respective one of the plurality of optical fiber bores wherein the alignment portion is configured to receive at least two optical fibers and is adapted to separate and align the at least two optical fibers parallel to the longitudinal axis in the lengthwise direction.

2. The multi-fiber ferrule according to claim 1, wherein the lead-in portion expands radially outward from the longitudinal axis in a direction extending from the alignment portion toward the rear face of the multi-fiber ferrule such that the lead-in portion guides the at least two optical fibers into the alignment portion generally parallel to the longitudinal axis.

3. The multi-fiber ferrule according to claim 1, wherein at least a portion of the alignment portion has a generally oval shape in cross section and also comprises at least one separating rib for separating a plurality of optical fibers and aligning the plurality of optical fibers generally parallel to the longitudinal axis.

4. The multi-fiber ferrule according to claim 1, wherein at least a portion of the alignment portion has a generally figure-eight shape in cross section for maintaining a plurality of optical fibers generally parallel to the longitudinal axis.

5. The multi-fiber ferrule according to claim 1, wherein the alignment portion comprises a ribbon alignment portion and a buffered fiber alignment portion, the ribbon alignment portion adjacent the optical fiber receiving portion and the buffered fiber alignment portion adjacent the lead-in portion.

6. The multi-fiber ferrule according to claim 5, wherein the ribbon alignment portion has a generally rectangular shape in cross section for maintaining the optical fibers of an optical fiber ribbon parallel to the longitudinal axis.

7. The multi-fiber ferrule according to claim 5, wherein the buffered fiber alignment portion comprises an elongated portion that has a generally oval shape in cross section.

8. The multi-fiber ferrule according to claim 5, wherein the buffered fiber alignment portion comprises an elongated portion that has an oval shape in cross section.

9. The multi-fiber ferrule according to claim 5, wherein the buffered fiber alignment portion has a cross section shape configured as two truncated circles adjacent one another.

10. The multi-fiber ferrule according to claim 5, wherein the buffered fiber alignment portion is sized to allow at least one buffered fiber to pass therethrough.

11. The multi-fiber ferrule according to claim 10, wherein the at least one buffered fiber is about 650 microns in diameter.

12. The multi-fiber ferrule according to claim 5, wherein the ribbon alignment portion is configured to align each of two optical fibers in a ribbon matrix with a respective optical fiber bore in the optical fiber receiving portion.

13. The multi-fiber ferrule according to claim 1, wherein the ferrule has an MT RJ configuration.

14. The multi-fiber ferrule according to claim 2, wherein the lead-in portion linearly expands in a radially outward direction from the longitudinal axis.

15. The multi-fiber ferrule according to claim 2, wherein the lead-in portion expands radially outward from the longitudinal axis in a nonlinear manner such that the lead-in portion defines a curved wall.

16. The multi-fiber ferrule according to claim 2, wherein the lead-in portion linearly expands in a radially outward direction from the longitudinal axis such that the lead-in portion has a generally frusto-conical shape.

17. A multi-fiber ferrule body comprising:
   a front face;
   an opposed rear face;
   an optical fiber receiving portion extending for a least a portion of a distance between the front and rear faces, the optical fiber receiving portion being adjacent the front face of the multi-fiber ferrule body to receive an end of at least two optical fibers and comprising a plurality of optical fiber bores extending from the front face toward the rear face; and
   an alignment portion disposed between the optical fiber receiving portion and the rear face for receiving the at least two optical fibers and aligning the end portion of the at least two optical fibers with a respective two of the plurality of optical fiber bores, wherein a portion of the alignment portion has a rectangular cross section and is configured to align each of two optical fibers in a ribbon matrix with a restive one of the plurality of optical fiber bores;
   wherein the at least one optical fiber is selected from the group consisting of a buffered optical fiber and an optical fiber ribbon.

18. The multi-fiber ferrule body of claim 17, further comprising a lead-in portion disposed between the rear face and the alignment portion, the lead-in portion expanding radially outward such that the lead-in portion is capable of guiding the at least two optical fibers into the adjacent alignment portion.

19. The multi-fiber ferrule body of claim 17, wherein at least a portion of the alignment portion is elongated and has a generally oval shape in cross section.

20. A multi-fiber ferrule having a front face and an opposed rear face and defining a longitudinal axis in a lengthwise direction, the multi-fiber ferrule comprising:
   an optical fiber receiving portion adjacent the front face for receiving the end portions of a plurality of optical fibers, said optical fiber receiving portion comprising a plurality of optical fiber bores extending parallel to the longitudinal axis;
   a lead-in portion adjacent the rear face for receiving and guiding the plurality of optical fibers into the multi-fiber ferrule; and
   an alignment portion between the optical fiber receiving portion and the lead-in portion for receiving the plurality of optical fibers and aligning the end portion of each of the plurality of optical fibers with a respective one of the plurality of optical fiber bores, the alignment portion comprising at least a portion having a generally oval cross section and at least one separating rib for separating the plurality of optical fibers.

* * * * *

UNITED STATES PATENT AND TRADEMARK OFFICE
CERTIFICATE OF CORRECTION

PATENT NO. : 6,971,803 B2
APPLICATION NO. : 10/799499
DATED : December 6, 2005
INVENTOR(S) : Mudd et al.

It is certified that error appears in the above-identified patent and that said Letters Patent is hereby corrected as shown below:

Col. 6, line 41 change "restive" to -- respective --.

Signed and Sealed this

Twenty-eighth Day of November, 2006

JON W. DUDAS
*Director of the United States Patent and Trademark Office*